US008065335B2

(12) United States Patent
Min et al.

(10) Patent No.: US 8,065,335 B2
(45) Date of Patent: Nov. 22, 2011

(54) METHOD FOR MANAGING AND PROCESSING INFORMATION OF AN OBJECT FOR PRESENTATION OF MULTIPLE SOURCES AND APPARATUS FOR CONDUCTING SAID METHOD

(75) Inventors: Ku Bong Min, Seoul (KR); Sung Joon Ahn, Gyeonggi-do (KR); Yu Kyoung Song, Gyeonggi-do (KR); Chang Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 330 days.

(21) Appl. No.: 12/096,570

(22) PCT Filed: Nov. 3, 2006

(86) PCT No.: PCT/KR2006/004559
§ 371 (c)(1),
(2), (4) Date: Oct. 17, 2008

(87) PCT Pub. No.: WO2007/066901
PCT Pub. Date: Jun. 14, 2007

(65) Prior Publication Data
US 2009/0319479 A1 Dec. 24, 2009

(30) Foreign Application Priority Data
Sep. 20, 2006 (KR) .......................... 10-2006-0091235

(51) Int. Cl.
*G06F 17/30* (2006.01)
(52) U.S. Cl. ........................................ 707/793; 707/736
(58) Field of Classification Search .................. None
See application file for complete search history.

(56) References Cited

U.S. PATENT DOCUMENTS

| 7,269,604 | B2 * | 9/2007 | Moore et al. ........................... 1/1 |
| 7,325,193 | B2 * | 1/2008 | Edd et al. ....................... 715/255 |
| 7,483,879 | B2 * | 1/2009 | Chang et al. ........................... 1/1 |
| 7,680,398 | B2 * | 3/2010 | Mita et al. ...................... 386/126 |
| 7,711,008 | B2 * | 5/2010 | Jones et al. .................... 370/503 |
| 2002/0116517 | A1 * | 8/2002 | Hudson et al. ................ 709/231 |
| 2002/0159640 | A1 * | 10/2002 | Vaithilingam et al. ........ 382/218 |
| 2004/0208480 | A1 | 10/2004 | Yoon et al. |
| 2004/0230566 | A1 * | 11/2004 | Balijepalli et al. ................ 707/3 |
| 2005/0004903 | A1 * | 1/2005 | Tsuda ............................... 707/3 |
| 2005/0135341 | A1 | 6/2005 | Kim |
| 2005/0165828 | A1 * | 7/2005 | Lango et al. ................... 707/102 |
| 2005/0228858 | A1 | 10/2005 | Mizutani et al. |

(Continued)

FOREIGN PATENT DOCUMENTS

JP    2005-182778    7/2005

(Continued)

*Primary Examiner* — Debbie Le
(74) *Attorney, Agent, or Firm* — Lee, Hong, Degerman, Kang & Waimey (57) ABSTRACT

In case that a main component and an auxiliary component to be presented in synchronization with the main one have to be presented through data transmission between both devices, the present invention issues connection preparation actions to the both devices respectively for each of a main component and at least one auxiliary component associated with the main component, issues actions to set access location (e.g., URL) of each of the components (the main component and the at least one auxiliary component) to at least one of the both devices, and issues play actions for each component to at least one of the both devices.

13 Claims, 11 Drawing Sheets

U.S. PATENT DOCUMENTS

| | | |
|---|---|---|
| 2006/0155723 A1* | 7/2006 | Kumar et al. .................. 707/100 |
| 2006/0161635 A1* | 7/2006 | Lamkin et al. ................. 709/217 |
| 2006/0195545 A1 | 8/2006 | Kikkawa et al. |
| 2006/0200740 A1* | 9/2006 | Kahn et al. .................... 715/500 |
| 2007/0220412 A1* | 9/2007 | Muhlhauser et al. ...... 715/500.1 |
| 2007/0233693 A1* | 10/2007 | Baxter et al. .................... 707/10 |

FOREIGN PATENT DOCUMENTS

| | | |
|---|---|---|
| JP | 2005-275828 | 10/2005 |
| WO | 2004/077303 | 9/2004 |

* cited by examiner

| Property | Data Type | Description |
|---|---|---|
| upnp:captionURI | xsd:anyURI | Contain a reference to a file for the captioning. It depends on captionURI@Profile |
| upnp:captionURI@Profile | xsd:string | Indicate the format of the captioning. e.g., SAMI, SMIL, etc. |
| upnp:captionURI@Filename | xsd:string | Indicate the name of file referred by captionURI. |
| upnp:captionURI@Language | xsd:string | Indicate languages supported by the caption (CSV) |

FIG. 4C

| Property | Data Type | Example |
|---|---|---|
| upnp:captionURI | xsd:anyURI | http://192.168.1.208:54919/MediaServerContent_0/2/0000000000000007/%20-%20SAMI_Ko_En.smi |
| upnp:captionURI@Profile | xsd:string | SAMI |
| upnp:captionURI@Filename | xsd:string | SAMI_Ko_En.smi ← |
| upnp:captionURI@Language | xsd:string | en-US, ko-KR ← |

| Property | Data Type | Example | |
|---|---|---|---|
| upnp:captionURI | xsd:anyURI | http://192.168.1.208:54919/MediaServerContent_0/2/0000000000000007/%20-%20SMIL_sample.smi | *402d₁* |
| upnp:captionURI@Profile | xsd:string | SMIL | |
| upnp:captionURI@Filename | xsd:string | SMIL_sample.smi (or SMIL_sample.SMIL) | |
| upnp:captionURI@Language | xsd:string | en-US, ko-KR ← | *402c* |
| upnp:captionURI | xsd:anyURI | http://192.168.1.208:54919/MediaServerContent_0/2/0000000000000007/%20-%20SMIL_sample_en.rt | *402d₂* |
| upnp:captionURI@Profile | xsd:string | SMIL | |
| upnp:captionURI@Filename | xsd:string | SMIL_sample_en.rt | |
| upnp:captionURI@Language | xsd:string | en-US | |
| upnp:captionURI | xsd:anyURI | http://192.168.1.208:54919/MediaServerContent_0/2/0000000000000007/%20-%20SMIL_sample_ko.rt | *402d₃* |
| upnp:captionURI@Profile | xsd:string | SMIL | |
| upnp:captionURI@Filename | xsd:string | SMIL_sample_ko.rt | |
| upnp:captionURI@Language | xsd:string | ko-KR | |

```
<userExperienceExpression>                    /511              /510
  <primary resource>
    <componentRes id="1" protocolInfo="....."> primary source in res element</componentRes>
    <componentRes id="2" protocolInfo="....."> primary source in res element</componentRes>
                              ⋮

<componentRes id="n" protocolInfo="....."> primary source in res element</componentRes>
  </primary resource>
                                                      /—520
  <additional resource>
    <componentPackage id="n+1">
      <upnp:additonalComponentRes ProtocolInfo="http-get:*:image/jpeg:*">
        http://10.0.0.1/subtitle/Terminator.sub</upnp:additonalComponentRes>        /—522
      <upnp:additonalComponentRes ProtocolInfo="http-get:*:text/plain:*">
        http://10.0.0.1/subtitle/Terminator.idx</upnp:additonalComponentRes>
    </ componentPackage >
    <componentPackage id="n+2">
      <additionalComponentRes protocolInfo="....">
        ResourceURL
      </additionalComponentRes>
    </ componentPackage >
                            ⋮                /—521

<componentPackage id="n+k">
      <additionalComponentRes protocolInfo="....">
        resource URL
      </additionalComponentRes>
    </ componentPackage >
  </additional resource>

<User Experience Name val="xxx">
    <componentList supportedAdditionalcap="......">                      /—531
      <primary> 1, 3</primary>
      <secondary> n+1, n+4, n+5, ....</secondary>
    </componentList>
    <capability val ="yyy" primary="1">                                  /—532
      <default> n+1</default>
      <optional> n+4 </optional>
    </capability>
    <capability val ="yyy" primary="3">
      <default> n+1</default>
      <optional> n+5 </optional>
    </capability>
  </User Experience Name>
</userExperienceExpression>                         \
                                                      530
```

FIG. 5C

```
<userExperienceExpression>
 <primary resource>
    <componentRes id="1" protocolInfo="....." > primary source in res element</componentRes>
    <componentRes id="2" protocolInfo="....." > primary source in res element</componentRes>
            .
            .
            .
    <componentRes id="n" protocolInfo="....." > primary source in res element</componentRes>
 </primary resource>

<additional resource>
   <componentPackage id="n+1">           ─542
      obj1234
   </ componentPackage >
   <componentPackage id="n+2">
      obj3456                                    } 541
   </ componentPackage >
         .
         .
         .
   <componentPackage id="n+k">
      obj7811
   </ componentPackage >
</additional resource>

<User Experience Name val="xxx">
   <componentList supportedAdditionalcap=".....">
      <primary> 1, 3</primary>
      <secondary> n+1, n+4, n+5, ....</secondary>
   </componentList>
   <capability val ="yyy" primary="1">
      <default> n+1</default>
      <optional> n+4 </optional>
   </capability>
   <capability val ="yyy" primary="3">
      <default> n+1</default>
      <optional> n+5 </optional>
   </capability>
</User Experience Name>
</userExperienceExpression>
```

```
<DIDL-Lite xmlns:dc="http://purl.org/dc/elements/1.1/"
  xmlns:upnp="urn:schemas-upnp-org:metadata-1-0/upnp/"
  xmlns="urn:schemas-upnp-org:metadata-1-0/DIDL-Lite/">     602
<item  id="obj1234"  parented="3" restricted="0">
    <dc:title>Terminator<dc:title>
        <upnp:class>object.item.TTOItem</upnp:class>         601
    <upnp:additonalComponent ProtocolInfo="http-get:*:image/jpeg:*">
        http://10.0.0.1/subtitle/Terminator.sub</upnp:additonalComponent>
    <upnp:additonalComponent ProtocolInfo="http-get:*:text/plain:*">
        http://10.0.0.1/subtitle/Terminator.idx</upnp:additonalComponent>
    <! -- More components place here -- >
</item>
</DIDL-Lite>
```

FIG. 7A

FIG. 7B

METHOD FOR MANAGING AND PROCESSING INFORMATION OF AN OBJECT FOR PRESENTATION OF MULTIPLE SOURCES AND APPARATUS FOR CONDUCTING SAID METHOD

1. TECHNICAL FIELD

The present invention relates to a method and apparatus for managing information about content sources stored in an arbitrary device on a network, e.g., a network based on UPnP and processing information among network devices according to the information.

2. BACKGROUND ART

People can make good use of various home appliances such as refrigerators, TVs, washing machines, PCs, and audio equipments once such appliances are connected to a home network. For the purpose of such home networking, UPnP™ (hereinafter, it is referred to as UPnP for short) specifications have been proposed.

A network based on UPnP consists of a plurality of UPnP devices, services, and control points. A service on a UPnP network represents a smallest control unit on the network, which is modeled by state variables.

A CP (Control Point) on a UPnP network represents a control application equipped with functions for detecting and controlling other devices and/or services. A CP can be operated on an arbitrary device which is a physical device such as a PDA providing a user with a convenient interface.

Figure 1A:
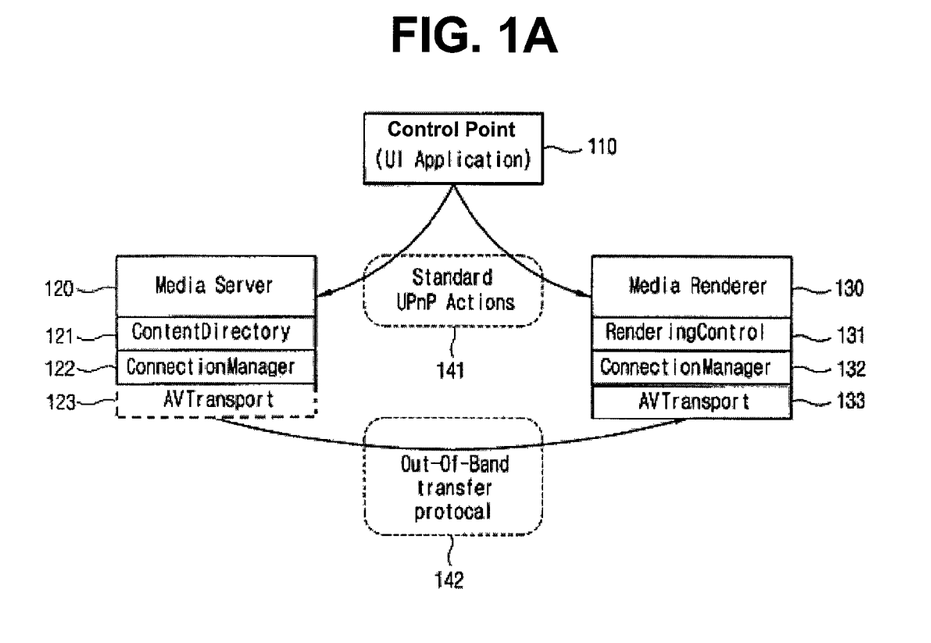
FIG. 1A illustrates a general structure of a UPnP AV network.

As shown in FIG. 1A, an AV home network based on UPnP comprises a media server (MS) 120 providing a home network with media data, a media renderer (MR) 130 reproducing media data through the home network and an AV control point (CP) 110 controlling the media server 120 and media renderer 130. The media server 120 and media renderer 130 are devices controlled by the control point 110.

The media server 120 (to be precise, CDS 121 (Content Directory Service) inside the server 120) builds beforehand information about media files and containers (corresponding to directories) stored therein as respective object information. 'Object' is a terminology encompassing items carrying information about more than one media file and containers carrying information about directories; an object can be an item or container depending on a situation. And a single item may correspond to multiple media files. For example, multiple media files of the same content but with a different bit rate from each other are managed as a single item.

Figure 1B:
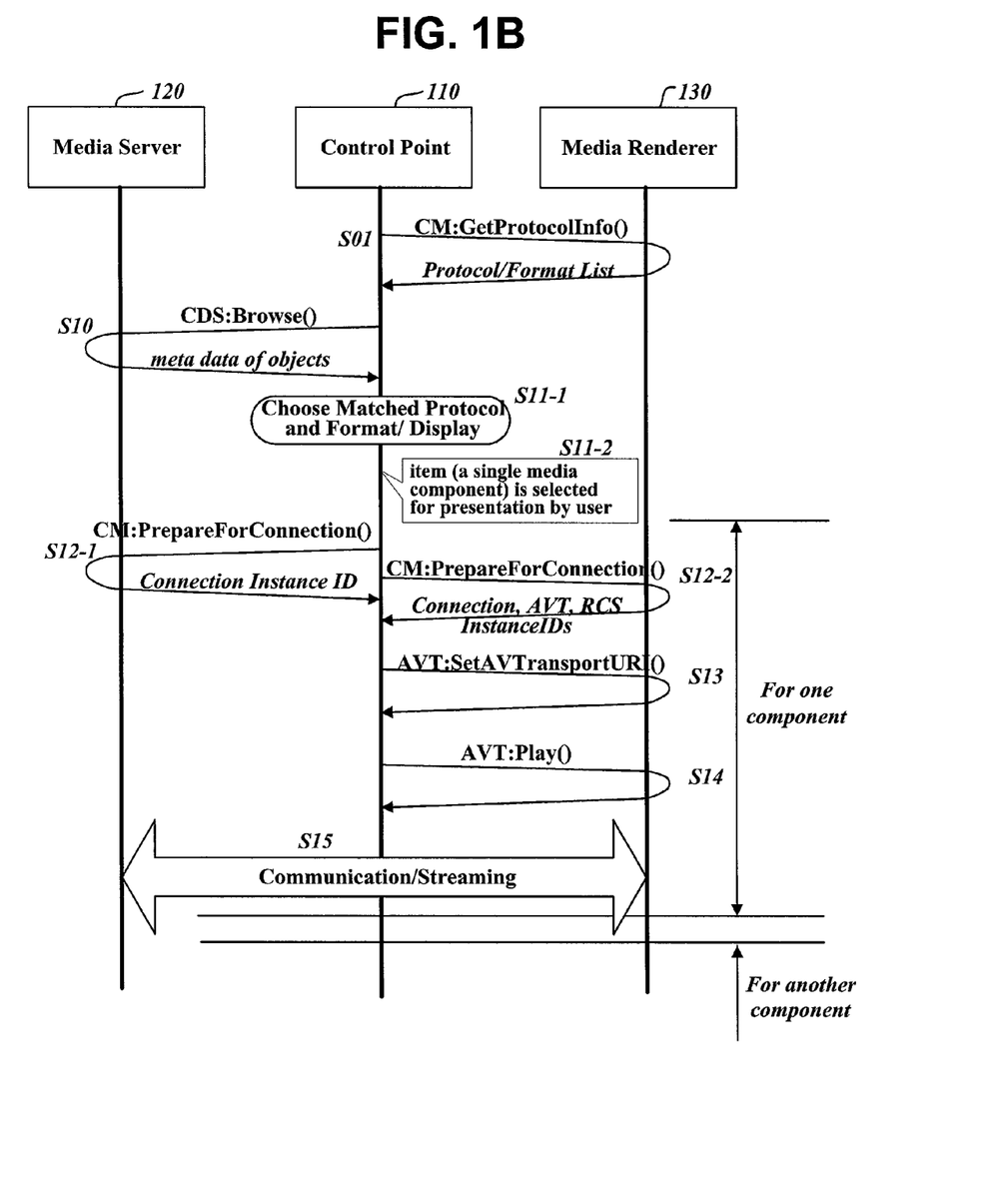
FIG. 1B illustrates a signal flow among devices for a media playback procedure carried out on the network of FIG. 1A.

FIG. 1B illustrates a simplified signal flow among devices describing media playback process carried out on a network of FIG. 1A, which is described in the following. First, the control point (CP) 110 obtains information about a protocol which the media renderer (MR) 130 can accommodate (S01). The media server (MS) 120, in order to notify the control point 110 of information about a directory and media files under the directory, notifies of information about a current directory and item information about media files under the directory each time a UPnP action 141, e.g., a browsing action, occurs in response to the user's request (S10).

The CP 110 excludes information about an item not conforming to an acceptable protocol provided by the media renderer 130 from the received information about each object, thus displaying the information to the user through a relevant UI (S11-1). If the user selects an item (or a media file of a particular feature belonging to the item) through the UI (S11-2), the CP 110 invokes a connection preparation action (PrepareForConnection( )) on each of the media server 120 and media renderer 130 for presentation of the selected media file (from now on, it is referred to as 'component' or 'media component') and receives a temporary ID (Instance ID) about constituting elements (CM, AVT, RCS) required for presentation based on streaming between the two devices 120, 130 (S12-1, S12-2). The temporary ID is used for specifying and subsequently controlling a streaming service to be carried out now. The CP 110 sets access location information about a previously selected component (e.g., URL (Universal Resource Locator) information) on AVTransport service 133 (in the example of FIG. 1A, AVTransport service is installed in a media renderer 130 but it can also be installed in a media server 120) through an action (S13) and by invoking (S14) a playback action on AVTransport service 133 and Rendering-Control service 131, makes data of the component selected through a relevant information exchange process between the media renderer 130 and media server 120 streamed and displayed by RCS 131 (S15).

If it is the case that an additional media file is to be presented during the presentation (S15), the procedure described above (S11-2, S12-1, S12-2, S13, S14) should be repeated after the start of the presentation. According to circumstances, S10 and S11-1 can also be carried out.

The method of carrying out the above procedure sequentially against two or more media components, however, cannot be easily applied to the case where two or more media components should be reproduced in synchronization with each other (hereinafter, two or more media components associated with each other are called as 'multiple components'), e.g., the case where one media component is a movie and the other one is a subtitle of the movie. It is because, if sequential reproduction were to be carried out, synchronized presentation at a media renderer could be hard to achieve or impossible due to time delay.

3. DISCLOSURE OF THE INVENTION

The present invention is directed to structure information about items in order for media components to be presented in association with each other to be presented exactly and provide a signal processing procedure according to the structured information and an apparatus carrying out the procedure.

A method for preparing meta data about stored content according to the present invention comprises creating meta data including protocol information and access location information about arbitrary content; creating property information including protocol information and access location information about auxiliary content to be reproduced in synchronization with the arbitrary content; and incorporating the created property information into the meta data.

Another method for preparing meta data about stored content according to the present invention comprises creating meta data including protocol information and access location information about arbitrary content; creating protocol information and access location information about auxiliary content to be reproduced in synchronization with the arbitrary content; incorporating into the meta data information created in the second creating step or link information for obtaining the information created in the second creating step; creating information about a presentation combination of a component belonging to the arbitrary content and a component belonging to the auxiliary content; and incorporating the created information about presentation combination into the meta data.

A method for presenting content through data transmission between both devices according to the present invention comprises, issuing a connection preparation action to the both devices respectively for each of the components, if a main component or one main component selected from a plurality of main components pertaining to the content is associated with at least one auxiliary component; issuing an action for specifying access location information of each of the components to at least one of the both devices; and issuing an action for requesting playback of each of the components to at least one of the both devices.

A method for searching content objects stored in a device according to the present invention comprises requesting browsing of content objects stored in the device and displaying browsing result information received in response to the requesting, wherein if information of each object included in the browsing result information has type information specifying that a corresponding content is for auxiliary presentation and is presented in synchronization with another content, the displaying step differentiates an object of the corresponding content from content objects for which such type information is not specified.

In one embodiment according to the present invention, the property information comprises protocol information and access location information about at least one component belonging to auxiliary content associated with main content, name of a file where the auxiliary content is recorded, information about recording format of a file where the auxiliary content is stored, and languages supported by the auxiliary content.

In one embodiment according to the present invention, the link information is object ID allocated to auxiliary content.

In one embodiment according to the present invention, the structure of an auxiliary content associated element in the meta data has the structure of a package in order for multiple components to be accommodated, which have to be reproduced in synchronization with a main component belonging to main content.

In one embodiment according to the present invention, a component corresponds to a data file storing data.

In one embodiment according to the present invention, the access location information is URL (Universal Resource Locator).

In one embodiment according to the present invention, a content object of type information specifying that the corresponding content is the one for auxiliary presentation in synchronization with another content is not displayed to the user during display of a browsing result.

In another embodiment according to the present invention, a content object of type information specifying that the corresponding content is the one for auxiliary presentation in synchronization with another content is displayed in a lighter color than that of a content object of different type information during display of a browsing result.

4. BRIEF DESCRIPTION OF THE DRAWINGS

FIGS. 5B through 5D respectively illustrate preparation examples of additional expression information 412 of FIG. 5A according to various embodiments of the present invention;

5. BEST MODE FOR CARRYING OUT THE INVENTION

Hereinafter, according to the present invention, preferred embodiments of a method for managing and processing information of an object for presentation of multiple sources and apparatus for conducting said method will be described in detail with reference to appended drawings.

Figure 2:
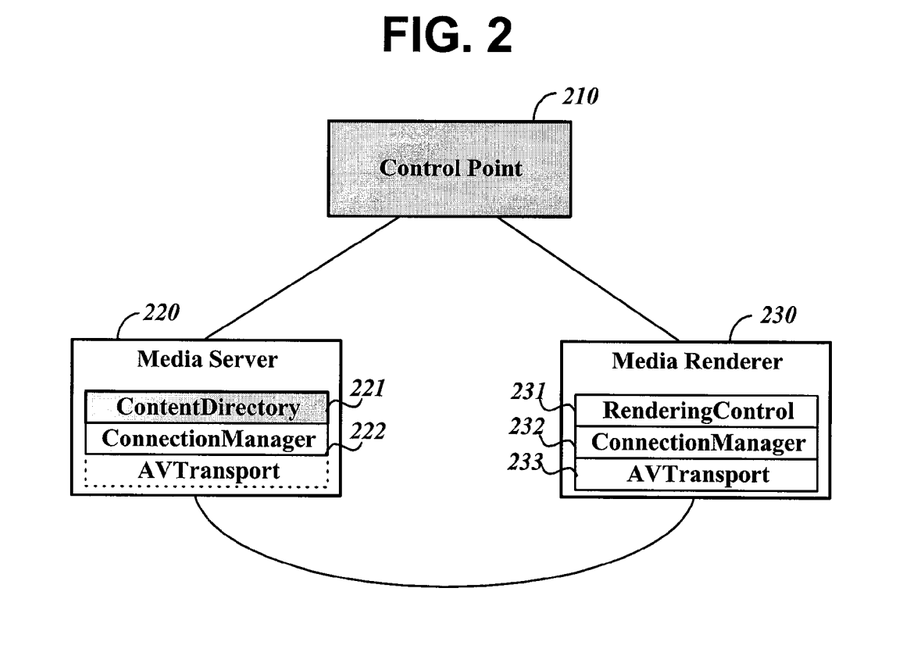
FIG. 2 illustrates structuring item information for content having associated auxiliary content and networked devices carrying out signal processing among devices.

FIG. 2 illustrates a simplified example of structuring item information for a component having an associated component and networked devices carrying out signal processing between devices. The network shown in FIG. 2 is an AV network based on UPnP, including a control point 210, a media server 220, and a media renderer 230. Although description on the present invention is given to networked devices based on UPnP standard, what are described in the following can be directly applied to other network standards by adaptively substituting necessary elements with regard to differences of the standards where the present invention may apply. In this regard, therefore, the present invention is not limited to a network based on UPnP.

Structuring item information for multiple components according to the present invention is conducted by CDS 221 within the media server 220. Signal processing for multiple components according to the present invention is an example, which is carried out according to the illustrated procedure of FIG. 3 centering on the control point 210.

Figure 3:
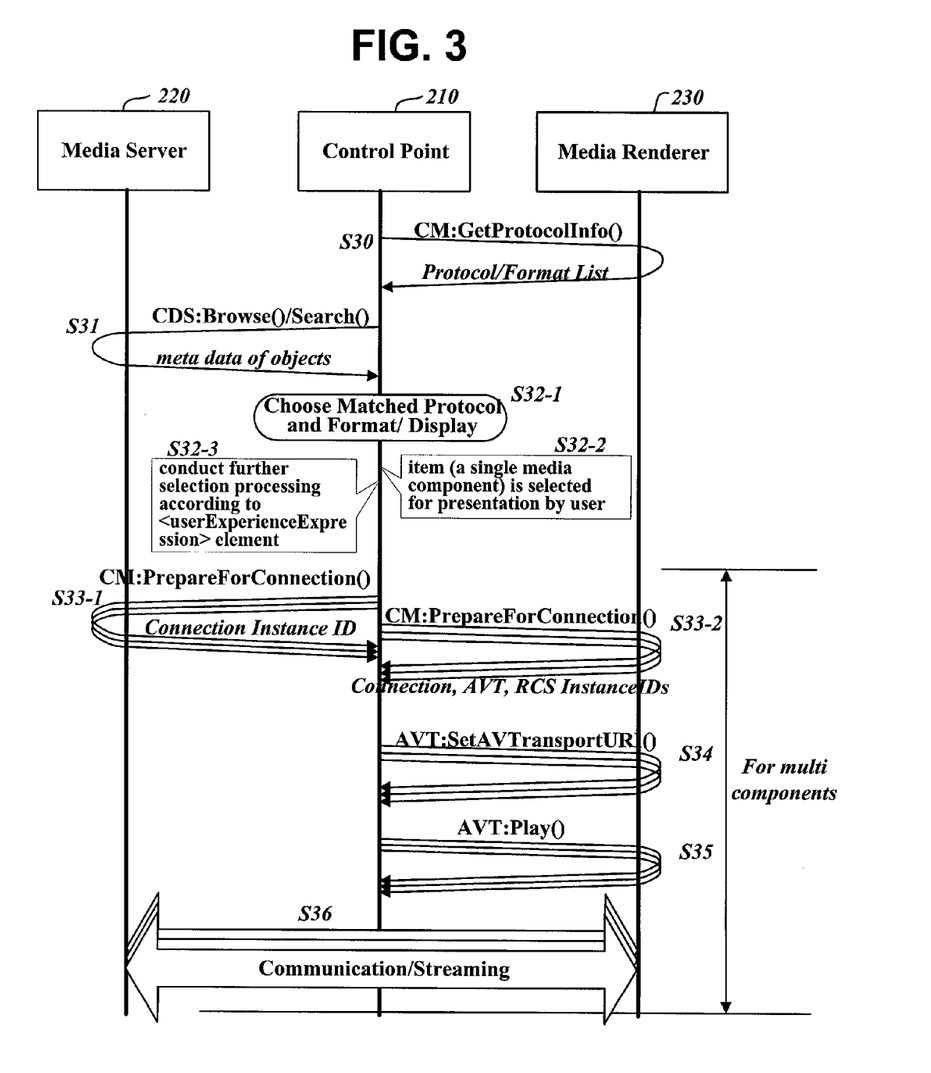
FIG. 3 illustrates a signal flow among devices for a media playback procedure of multiple components carried out on the network of FIG. 2.

Meanwhile, composition of devices and procedure of signal processing illustrated in FIGS. 2 and 3 are related to one of two different methods for streaming a media component, namely, pull method between push and pull method. However, difference between push and pull method lies only in the fact that a device equipped with AVTransport service for playback management of streaming or an employed device can be varied and subsequently the direction of an action can be varied according to whether the object of the action is a media server or media renderer. Therefore, methods for conducting actions described in the following can be equally applied to both of push and pull method and interpretation of the claimed scope of the present invention is not limited to those methods illustrated in the figures and description.

Figure 4A:
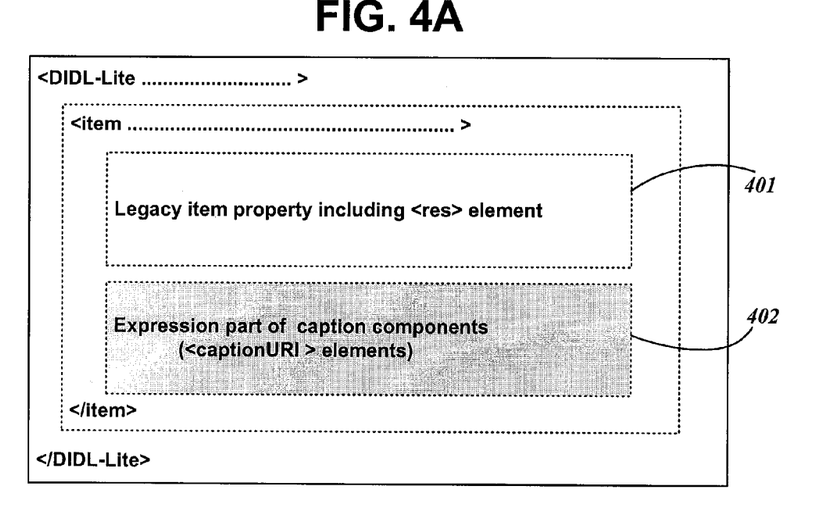
FIG. 4A illustrates a simplified structure of item information according to one embodiment of the present invention, the structure being constructed including information about auxiliary content presented in association with the corresponding content.

CDS 221 within the media server 220 (which may be a processor executing software) prepares item information about media components, namely meta data about each component or a group of components in the form of a particular language through search for media files stored in a mass storage such as a hard disk. At this time, media files associated for synchronized presentation, e.g., caption files storing information for displaying subtitles are considered as individual content and single item information is created. FIG. 4A shows the structure of item information according to one embodiment of the present invention created by the above method. That is to say, among individual components considered to belong to a single item, in addition to item property information 401 including legacy resource elements (resource element: <res>) about a main component (e.g., AV stream) or main components, caption expression information 402 specifying an auxiliary component (e.g., subtitles, voice, etc.) or auxiliary components are additionally prepared.

The CDS 221 determines inter-relation among respective media files and which is a main component or auxiliary component from, e.g., the name and/or extension of each file. If necessary, information about properties of each file, whether the file is a text or image and/or coding format can also be determined from the extension of the corresponding file. Also, if needed, the above information can be identified from header information within each file by opening the corresponding file; further, the above information can be easily obtained from a DB about pre-created files (by some other application programs) for stored media files, which is stored in the same medium.

Figure 4B:
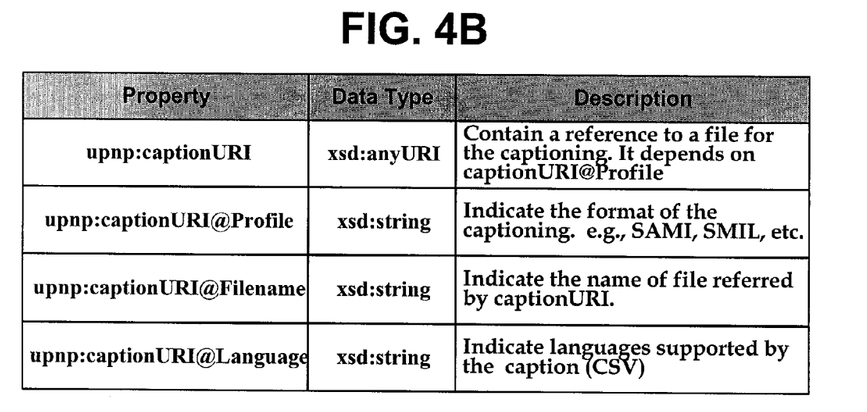
FIG. 4B illustrates a structure of caption expression information 402 of FIG. 4A according to one embodiment of the present invention.

FIG. 4B illustrates types of property information recorded in the caption expression information 402 according to one embodiment of the present invention. As illustrated, the caption expression information 402 records information about URL (Universal Resource Locator) of a caption file, information about the format of the caption file (the notation of captionURI@Profile in the figure represents information as specified by a profile attribute describing the element of <captionURI>, that is, information specified by an expression form of <captionURI Profile=>), name of the caption file (captionURI@Filename), and language supported by the caption file (captionURI@Language). The format of the caption file represents a recording method by which information about a caption is stored in a file, which for example, can be SAMI or SMIL. Although properties of caption expression information illustrated in FIG. 4B are related to a subtitle which displays spoken words in a video with characters, as mentioned earlier, the properties can also be applied to a file about voice associated with a video, or a file of some other type, e.g., a data file such as a slideshow. It is certain that change, modification, or addition of relevant property information is necessary; however, simple change or addition accompanying the change of properties of data (caption, voice, etc.) can be understood to still belong to the scope of the present invention. If properties of data are different, specification thereof can be done by using a profile about the format (captionURI@Profile).

Figure 4C:
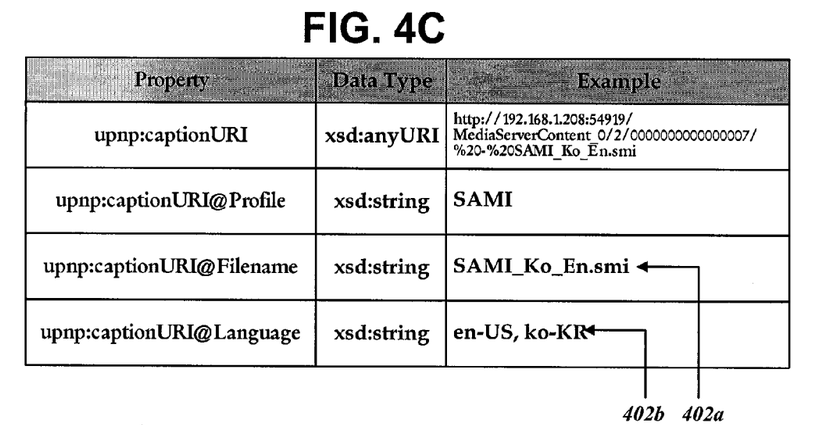
FIGS. 4C and 4D respectively illustrate examples of caption expression information prepared according to the structure of FIG. 4B.

FIG. 4C illustrates an example of caption expression information 402 being prepared as information for a caption has been prepared in the format of SAMI according to an exemplified structure of the caption expression information of FIG. 4B. Since a file in SAMI format can accommodate file synchronization information to synchronize with image data and caption data supporting multiple languages all within a single file, as shown in FIG. 4C, recorded are a filename 402a specifying a corresponding file and supported languages of caption data stored in the file, namely, information specifying English and Korean 402b.

Figure 4D:
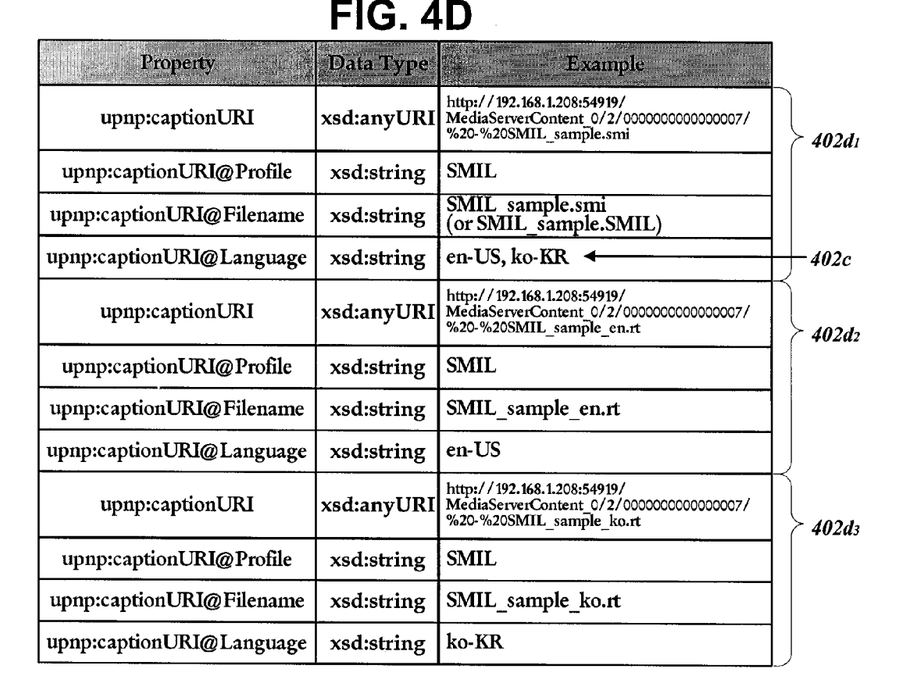

FIG. 4D illustrates an example of caption expression information 402 being prepared as information for a caption has been prepared in the format of SMIL according to an exemplified structure of the caption expression information of FIG. 4B. For the case of SMIL format, synchronization information for synchronizing with image data (since the synchronization information is equally applied to data files of various languages, all of language information of provided caption data files (SMIL_sample_en.rt, SMIL_sample_ko.rt) are recorded in the supported language property (captionURI@Language) of the synchronization information 402c) and caption data are stored in a separate file; and caption data are also stored in separate files according to respective languages. Therefore, for the case of SMIL format, as shown in the preparation example of FIG. 4D, synchronization information file (SMIL_sample_smi) and two files (SMIL_sample_en.rt, SMIL_sample_ko.rt) supporting two languages (English and Korean) are represented by respective <captionURI> elements. Namely, multiple <captionURI> elements $402d_1$, $402d_2$, $402d_3$ are included in the caption expression information 402. In another embodiment according to the present invention, by specifying the extension of a synchronization information file prepared according to SMIL format as SMIL (*.SMIL), caption files (*.smi) prepared according to SAMI format can be distinguished in terms of the type of extension.

Figure 5A:
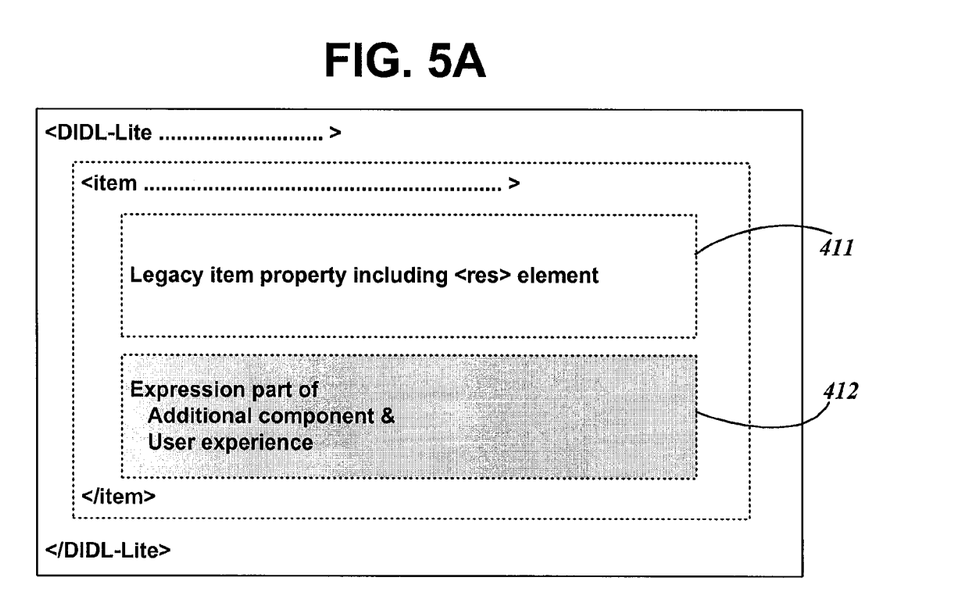
FIG. 5A illustrates a simplified structure of item information according to another embodiment of the present invention, the structure being constructed including information about auxiliary content presented in association with the corresponding content.

In another embodiment according to the present invention, as described above, when the CDS 221 creates one item information by regarding media files associated with a main component as single content, meta data are prepared according to the structure of FIG. 5A. That is to say, as shown in the figure, among individual components considered to belong to a single item, in addition to item property information 411 including legacy resource elements (resource element: <res>) about a main component (e.g., AV stream) or main components, additional expression information 412 specifying various combinations of information about an auxiliary component or auxiliary components and user experience are additionally prepared.

FIG. 5B illustrates an example of preparing the additional expression information 412 according to one embodiment of the present invention. According to the embodiment illustrated in FIG. 5B, the additional expression information 412 (<userExperienceExpression>) comprises, e.g., three elements. A first element 510 is a resource element (<primary resource>) for a main component, assigning an ID to a main component or main components included in a resource element within the item property information 411. In the example of FIG. 5B, IDs starting from 1 to n are allocated respectively to n main components 511.

A second element 520 is a resource element (<additional resource>) for an auxiliary component, allocating IDs to auxiliary components to be presented in synchronization with the main component and recording an access protocol and location information. In the example of FIG. 5B, IDs starting from n+1 to n+k are allocated to k auxiliary component packages 521. The reason why an ID is allocated to a package consisting of more than one component but not to each auxiliary component is that some components require a combination of multiple components (media files) for normal presentation. For the example of files "Terminator.sub" and "Terminator.idx" shown in FIG. 5B, the former contains image information for subtitles while the latter contains timing information for synchronizing AV data of a main component (e.g., "Terminator.mpeg") and subtitle information within Terminator.sub; therefore, a single component package is allocated for the components in the two files and a single identifier n+1 is allocated 522.

A third element 530 is an experience element (<UserExperience>) about a combination enabling (namely, enabling the user to experience) coupled presentation of a main component and auxiliary component, expressing a possible combination of components to which respective identifiers are allocated from the first element 510 and the second element 520. In the example of FIG. 5B, for a current item, main components capable of presentation are 1 and 3 while auxiliary components are n+1, n+4, and n+5 531; as to a combination capable of presentation, auxiliary components to be synchronized with a main component 1 are n+1 and n+4; and when no particular selection has been made by the user, a default auxiliary component to be synchronized is specified as n+1 532. Any set capable of combination for presentation can be arbitrarily added by an element of <capability>. FIG. 5B illustrates the case when the number of sets capable of combination is two.

Also, multiple <capability> elements can be allocated for a single main component. As a matter of course, ID of a main component within each <capability> element is the same but IDs of the corresponding auxiliary components (or auxiliary component package) are different from each other. In this way, the example where multiple <capability> elements can be prepared for a single main component corresponds to the case where multiple auxiliary components for subtitles and multiple auxiliary components for voice in different languages are prepared with regard to a single main AV component. As described above, when multiple <capability> elements are prepared for a single main component, information about properties of auxiliary components belonging to each <capability> element can be inserted as parameters of <capability>.

Item information prepared as illustrated in FIGS. 4A and 5A is delivered from the CDS 221 to the CP 210 in response to a browsing or search action and interpreted. The CP 210, according to the interpretation, provides relevant information for user's selection, which is described later.

Figure 5C:
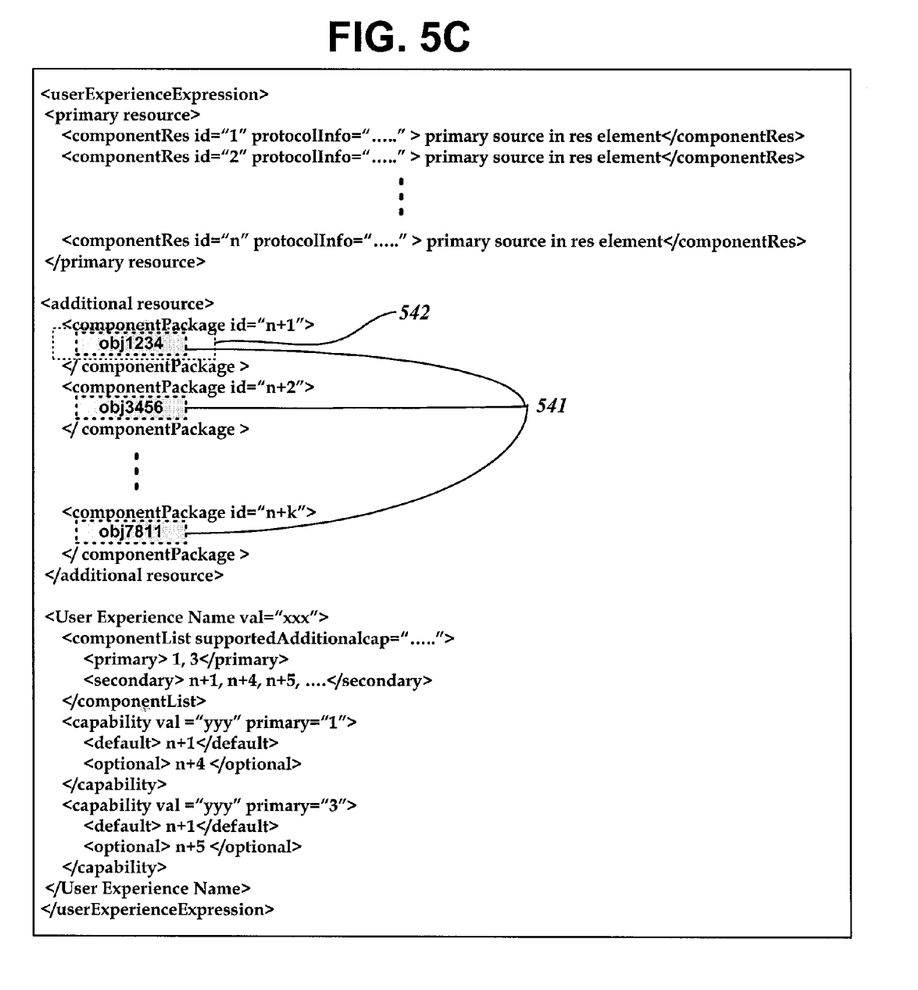

Meanwhile, the embodiment of FIG. 5B illustrates protocol information ("protocolInfo") about an auxiliary component and location information to access the component, e.g., by inserting URL information to the item information of directly related content thereof. However, in another embodiment of the present invention, instead of protocol and URL information about an auxiliary component related with a main component, indirect information enabling to check the information can be recorded. For example, the indirect information can be an ID of an object allocated to an associated auxiliary component. FIG. 5C illustrates additional expression information prepared under the condition of FIG. 5B according to the present embodiment. As shown in FIG. 5C, an object ID for the corresponding auxiliary component is prepared instead of protocol and URL information for a component 541.

Figure 6:
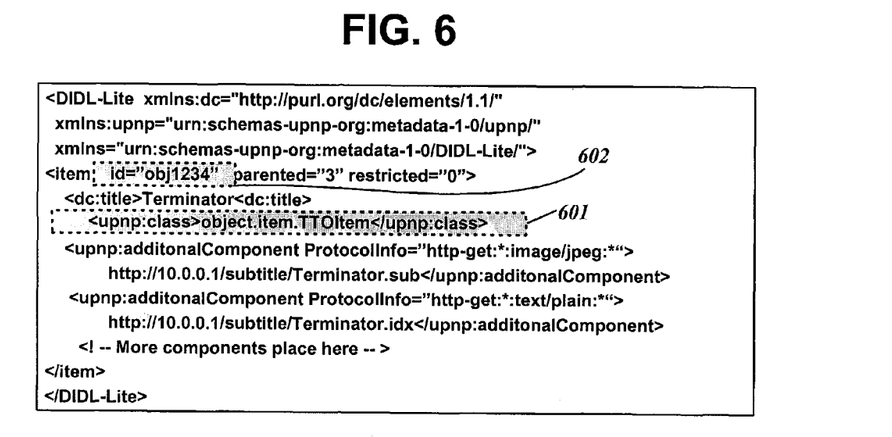
FIG. 6 illustrates an example of preparing item information about content for auxiliary presentation in association with another component but not for separate presentation.

In the embodiment of FIG. 5C, the CDS 221, while checking recorded media files and the corresponding recording tree structure, configures components to be presented complementarily to other components but not independently (which is identified by the extension of a file as described earlier) into objects and prepares item information about each object in the form as illustrated in FIG. 6. However, since such objects require separate management differently from objects of components to be presented independently, separate type 601, e.g., "object.item.TTOItem" is allocated to those objects. As mentioned in the description of FIG. 5B, the example of FIG. 6 describes the case when an object is allocated to and item information is prepared for a group of auxiliary components capable of normal presentation only through sharing individual information, but incapable of normal presentation on its own (or only providing meaningless presentation). Item information prepared in FIG. 6 is linked to indirect information 542 about an auxiliary component through an object ID, namely, obj1234, which is specified in additional expression information of FIG. 5C.

Figure 5D:
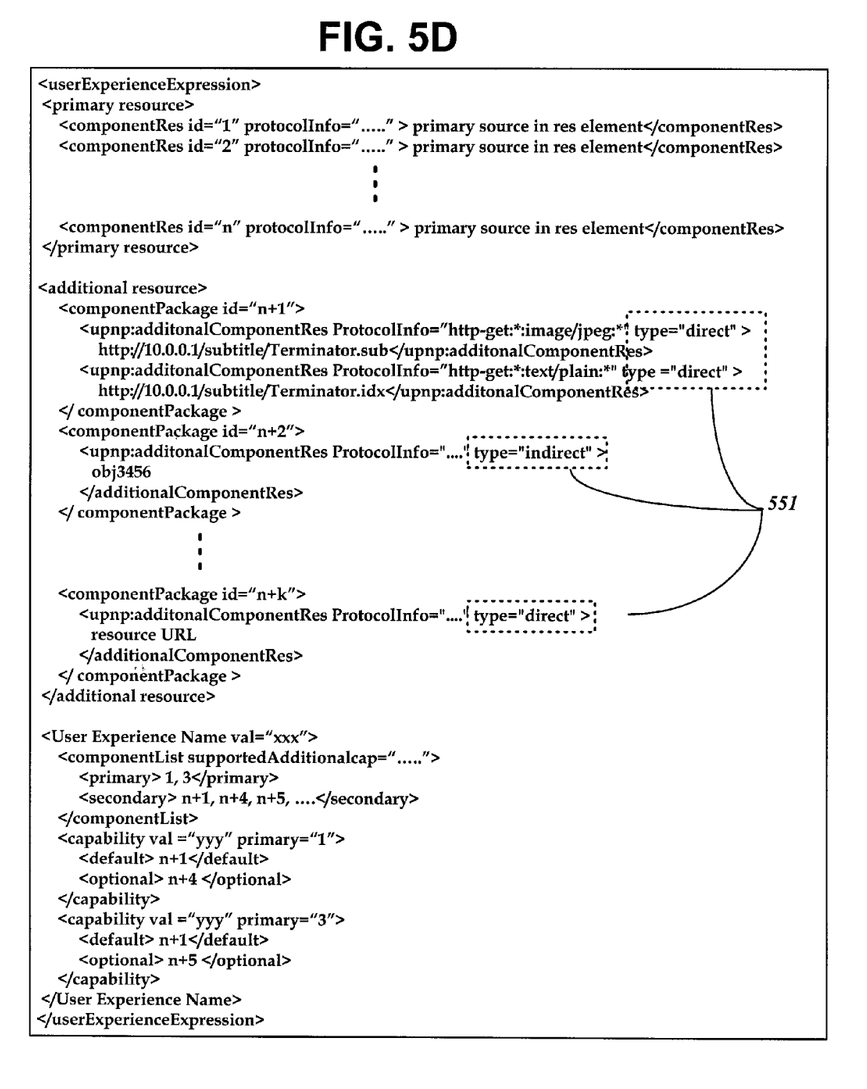

In a further embodiment according to the present invention, protocol information about an auxiliary component and URL information about the component are prepared by utilizing a direct information specification method of FIG. 5B together with an indirect specification preparation method of FIG. 5C. FIG. 5D illustrates an example of additional expression information prepared according to the above. As shown in the figure, protocol information and URL information about an additional component are directly specified or an object ID for an auxiliary component (or auxiliary component package) is specified. As shown in FIG. 6, components recording an object ID should necessarily be allocated as an object and item information about the object should be prepared. As in the present embodiment, since information about an auxiliary component can be recorded intermingled either directly or indirectly, in order for the CP 210 to readily distinguish the difference, information about the type of source expression, namely, "direct" or "indirect" is additionally specified in a resource element about an auxiliary component (<additionalComponentRes>) 551 so that the CP 210 which interprets meta data about an object should easily recognize protocol information and URL information about an auxiliary component.

After item information about stored files has been built according to the above method or one of the above methods, as shown in FIG. 3, information about each item is delivered from the CDS 221 to the CP 210 by a browsing action or search action of the CP 210 (S31). As a matter of course, before invoking such an action, as shown in FIG. 3, the CP 210 requests acceptable protocol information on a media renderer 230, thereby obtaining the protocol information beforehand (S30).

The CP 210, from information of objects received at S31 step, provides the user only with those objects (items) having protocol information accepted by the media renderer 230 through a relevant UI (User Interface) (S32-1). At this time, as shown in FIG. 6, an item of type "object.ite.TTOItem" is not exposed to the user. In another embodiment according to the present invention, an item of type "object.item.TTOItem" is displayed to the user with a lighter color than those of items of other types, thereby being differentiated from the others.

Meanwhile, the user selects from a list of the provided objects an item (or a single component among multiple components of a separate bit rate belonging to the item) to be presented at the media renderer 230 (S32-2). On the other hand, if caption expression information (<captionURI> element according to the structure of FIG. 4B) or additional expression information (information corresponding to <userExperienceExpress> element in FIGS. 5B through 5D) exists in meta data of a selected item, an action for presentation of a component of a selected item is not readily carried out, but as described below, the caption expression information (the case of the embodiment of FIG. 4A) or the additional expression information (the case of the embodiment of FIG. 5A) is interpreted and an additional selection action is carried out according thereto (S32-3).

In the embodiment according to FIG. 4A, the CP 210 checks elements of caption expression information in meta data of a selected item and if the elements are not found, actions for reproducing a selected component (PrepareForConnection( ), SetAVTransportURI( ), Play( ), etc.) are immediately requested in sequential order. Otherwise, with regard to a file (a single file in the example of FIG. 4C) or files (three files in the example of FIG. 4D) for a caption specified by each <captionURI> element, the CP 210, in addition to the content corresponding to the selected item, notifies the media server 220 and media renderer 230 respectively through a separate connection preparation action (PrepareForConnection( )) and obtains a temporary ID (S33-1, S33-2) By using the temporary ID, the CP 210 sets separately access location information of a main component and a file or files, e.g., URL information to AVTransport service 233 (S34). A file or files for a caption notified of as above are pre-fetched to the media renderer 230 upon a request of a subsequent play action. Namely, for all of the files related with a caption, irrespective of presentation time of the content of an associated item, when a play action is invoked on the URL of each of the corresponding files, the file of the URL is downloaded from the media server 220 to the media renderer 230, thus being prepared before presentation.

While conducting such operations, the CP 210 checks property information caption@Language about caption data within a selected item, provides information about supported languages through a relevant UI in the form of a list on a screen, receives the user's selection for a particular language, and requests presentation activation about the corresponding language on RenderingControl service 231 of the media renderer through a relevant action. Then the RenderingControl service 231, once streaming of selected content is started afterwards, carries out rendering of the data together with rendering of caption data of an activated language by reading out from a pre-fetched file or one of pre-fetched files.

If a request for change of a caption language is issued from the user during the play, the CP 210 invokes an action for requesting change of presentation activation state as described above on the RenderingControl service 231; and the RenderingControl service 231 reads out and carries out rendering of caption data in a language requested for change within a pre-fetched file or data within one of files containing caption data in a language requested for change, thereby changing a displayed caption language.

Figure 7A:
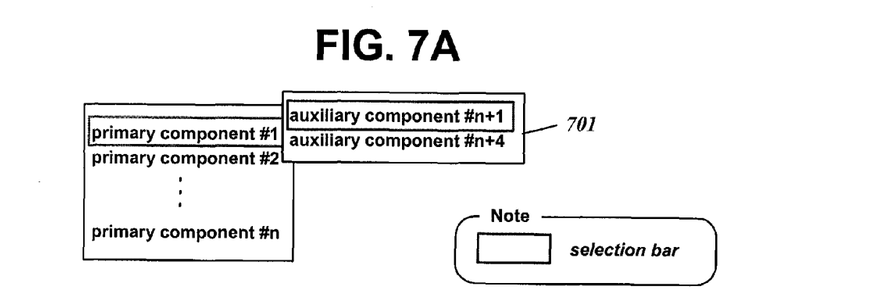
FIG. 7A illustrates an example of auxiliary content being displayed on a list for selection of the user when auxiliary content to be reproduced in association with a selected main component exists.

In an embodiment according to FIG. 5A, the CP 210 confirms from meta data of a selected item an element of <User Experience> specifying a possible combination for presentation. If the ID of a currently selected component (the ID can be identified from a resource element (<primary resource>) of a main component within additional expression information) is not specified in <componentList> element, the CP 210 immediately requests actions for reproducing selected components in sequential order. Otherwise, the CP 210 identifies the type of an auxiliary component from <capability> element and displays a list of auxiliary components additionally to the user, the <capability> element being specified subsequent to <UserExperience> element and containing the ID of the identical main component. FIG. 7A is one example of displaying the list. FIG. 7A shows an example that as a component of ID 1 is selected as a main component, a list 701 of components (or a component package) of ID n+1 and n+4 which are auxiliary components associated therewith is displayed; since the ID of a default component is n+1, the figure shows that a selection bar is located on an auxiliary component specified as a default. In the example of FIG. 7A, although each component is distinguished in terms of the component's ID for the purpose of convenience, actual information displayed to the user can be a filename or an object title (the case when auxiliary components are allocated to a separate object as shown in FIG. 6) corresponding to the component.

Figure 7B:
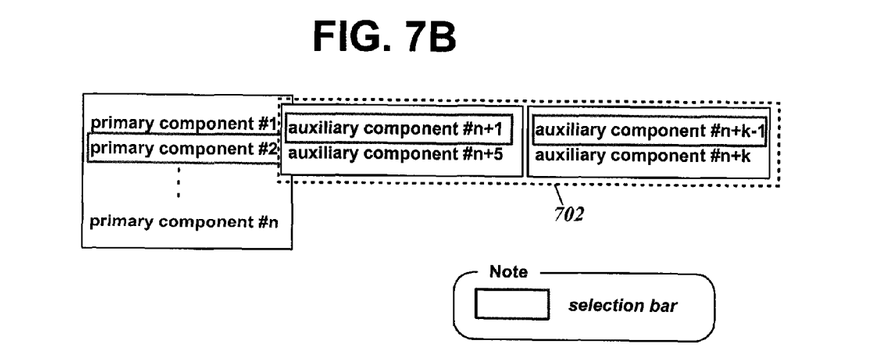
FIG. 7B illustrates an example of a plurality of auxiliary content being displayed respectively on a list for selection of the user when a plurality of auxiliary content to be reproduced in association with a selected main component exists.

If the number of combination element (<capability>) is more than one for a selected main component, as shown in FIG. 7B, a selection window 702 is displayed for each <capability> element and an auxiliary component (or a component package) is selected from respective selection windows. As shown in FIG. 7B, when multiple combination elements are displayed to the user, properties of each combination element, e.g., information indicating a subtitle or voice can be displayed together on top of the selection window.

According to the procedure described above, when selection of a main component and an auxiliary component is completed, the CP 210 obtains protocol information and URL information about the selected component from associated elements. That is to say, for a main component, the above information is obtained from <res> element within property information prepared as usual, while for an auxiliary component, the above information is obtained from <additional resource> element described above. In the embodiments of FIGS. 5C and 5D, when information about the corresponding component is specified indirectly, the CP 210 obtains the corresponding protocol information and URL information by utilizing the corresponding indirect information, namely object ID as index information. For example, the CP 210 requests a search action on the CDS 221, thereby obtaining required protocol information and URL information from the corresponding element (<additionalComponent> element in the example of FIG. 6) prepared in the received meta data, the search action as an input argument having information prepared in meta data if the meta data of the corresponding object ID had been received through a previous browsing operation, otherwise, having information including the object ID.

If the protocol information of an auxiliary component obtained from the above procedure did not comply with a protocol accepted by the media renderer 230, the corresponding auxiliary component would be ignored and in such a case, operations described below for presentation at the media renderer 230 are not carried out. Instead, a notification message such as "The selected auxiliary component cannot be expressed at media renderer!" can be displayed to the user.

With regard to a main component and an auxiliary component for which protocol information and URL information have been secured, first, a connection preparation action (PrepareForConnection( )) is requested respectively on the media server 220 and media renderer 230, namely, for each component, thereby receiving temporary IDs (Instance IDs) of participating elements required for presentation through streaming between devices (S33-1, S33-2). These temporary IDs are used for designating and controlling each component associated with a streaming service to be carried out now. The example of a signal processing flow of FIG. 3 illustrates the case of two auxiliary components (or one auxiliary component package) associated with a single main component, showing a situation where the same action (since the input argument of an action has been prepared for each component and therefore has separate information) has been requested three times between devices.

When a temporary ID for connection of each component is received from a connection preparation action, the CP 210 associates respectively access location information about each component selected beforehand, e.g., URL information with AVTransport service 233 (S34) and requests a playback action on AVTransport service 233 and RenderingControl service 231 respectively for each component (S35). Accordingly, data of each component selected through a relevant information exchange procedure between the media renderer 230 and media server 220 are streamed or downloaded; and displayed in association with each other under the control of RenderingControl service 231 being decoded by the corresponding decoder (or a decoder of integrated functionality) (S36).

The present invention described through a limited number of embodiments above, while data is transferred and presented between interconnected devices through a network, enables a main component to carry out operations for playback and a playback operation at the same time together with an auxiliary component such as caption data associated therewith, thereby enabling synchronized playback of a media component to be carried out normally. Accordingly, the user's feeling of satisfaction about watching or listening to the content can be enriched through an auxiliary component.

The foregoing description of a preferred embodiment of the present invention has been presented for purposes of illustration. Thus, those skilled in the art may utilize the invention and various embodiments with improvements, modifications, substitutions, or additions within the spirit and scope of the invention as defined by the following appended claims.

The invention claimed is:

1. A method for preparing meta data for stored content, the method comprising:
creating meta data including first protocol information and first access location information for a main content;
creating property information including second protocol information and second access location information for auxiliary content to be reproduced in synchronization with the main content in a renderer; and
incorporating the created property information into the meta data;
transmitting, to the renderer, the main content when the main content is requested;
transmitting, to the renderer, the auxiliary content when the auxiliary content is requested,
wherein the first access location information comprises information for a path where the main content is stored,
wherein the first protocol information is utilized when determining whether the renderer supports rendering of the main content,
wherein the second access location information comprises information for a path where the auxiliary content is stored, and
wherein the second protocol information is utilized when determining whether the renderer supports rendering of the auxiliary content.

2. The method of claim 1, wherein the auxiliary content includes caption data to be displayed in characters.

3. The method of claim 2, wherein the property information further includes information for languages supported by the auxiliary content, and information for a recording method of a file which stores the auxiliary content.

4. The method of claim 3, wherein the property information further includes a name of the file which stores the auxiliary content.

5. A method for presenting content via data transmission between devices, the method comprising:
issuing, according to meta data, a preparation action to the devices for a main content and an auxiliary content when the main content is associated with the auxiliary content;
issuing an action for setting first access location information and second access location information to at least one of the devices; and
issuing an action for requesting playback of each of the main content and the auxiliary content to at least one of the devices,
wherein the meta data includes first information for the main content and second information for the auxiliary content,
wherein the first information includes first protocol information and first access location information and the second information includes second protocol information and second access location information,
wherein the first protocol information is utilized when determining whether one of the devices supports rendering of the main content,
wherein the first access location information indicates a path where the main content is stored
wherein the second protocol information is utilized when determining whether one of the devices supports rendering of the auxiliary content,
wherein the second access location information indicates a path where the auxiliary content is stored, and
wherein the auxiliary content is reproduced in synchronization with the main content on one of the devices.

6. The method of claim 5, wherein the second information stored in the meta data is utilized to determine if the main content is associated with the auxiliary content.

7. The method of claim 6, wherein the second information includes at least, a name of a file where the auxiliary content is stored, information for a recording format of a file where the auxiliary content is stored, and information for languages supported by the auxiliary content.

8. The method of claim 6, wherein the second information comprises:
a first element comprising identifying information for the main content;
a second element comprising identifying information for the auxiliary content associated with the main content; and
a third element storing combination information for the auxiliary content and the main content.

9. The method of claim 5, wherein the auxiliary content associated with the main went content is selected by a user from a plurality of auxiliary content provided for user selection.

10. The method of claim 5, wherein the main content comprises AV data and the auxiliary content comprises information for presenting subtitles.

11. The method of claim 5, wherein the connection preparation action is invoked for auxiliary content associated with the main content.

12. An apparatus for providing stored content for another device through a network, the apparatus comprising:
a storage unit configured to store main content and auxiliary content to be presented in synchronization with the main content; and
a processor configured to:
create meta data including first protocol information and first access location information associated with the main content;

create property information including second protocol information and second access location information associated with the auxiliary content;
incorporate the created property information into the meta data;
transmit, to a renderer, the main content when the main content is requested; and
transmit, to the renderer, the auxiliary content when the auxiliary content item is requested,
wherein the first access location information indicates a path where the main content is stored,
wherein the first protocol information is utilized when determining whether the renderer supports rendering of the main item,
wherein the second access location information indicates a path where the auxiliary content is stored, and
wherein the second protocol information is utilized when determining whether the renderer supports rendering of the auxiliary content.

13. An apparatus for presenting content via a data transmission between devices, the apparatus comprising:
an interface unit configured to transmit and receive a signal;
a processor configured to:
issue, via the interface unit, according to meta data, a connection preparation action to the devices for a main content and an auxiliary content when the main content is associated with the auxiliary content;
issue, via the interface unit, an action for setting a first access location information and a second access location information to at least one of the devices; and
issue, via the interface unit, an action for requesting playback of the main content and the auxiliary content to at least one of the devices;
wherein the meta data includes first information for the main content and second information for the auxiliary content,
wherein the first information includes first protocol information and first access location information and the second information includes second protocol information and second access location information,
wherein the first protocol information is utilized when determining whether one of the devices supports rendering of the main content,
wherein the first access location information indicates a path where the main content is stored,
wherein the second protocol information is utilized when determining whether one of the devices supports rendering of the auxiliary content, and
wherein the second access location information indicates a path where the auxiliary content is stored, and
wherein the auxiliary content is reproduced in synchronization with the main content in one of the devices.

* * * * *